(12) United States Patent
Morokuma et al.

(10) Patent No.: US 11,601,054 B2
(45) Date of Patent: Mar. 7, 2023

(54) POWER SEMICONDUCTOR DEVICE PROTECTION CIRCUIT AND POWER MODULE

(71) Applicant: Mitsubishi Electric Corporation, Tokyo (JP)

(72) Inventors: Kenichi Morokuma, Tokyo (JP); Takuya Sakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 375 days.

(21) Appl. No.: 17/042,190

(22) PCT Filed: Mar. 12, 2019

(86) PCT No.: PCT/JP2019/009914
§ 371 (c)(1),
(2) Date: Sep. 28, 2020

(87) PCT Pub. No.: WO2019/225121
PCT Pub. Date: Nov. 28, 2019

(65) Prior Publication Data
US 2021/0028702 A1    Jan. 28, 2021

(30) Foreign Application Priority Data

May 23, 2018 (JP) .............................. JP2018-098620

(51) Int. Cl.
*H02M 3/158*   (2006.01)
*H02H 7/00*    (2006.01)
*H02M 1/32*    (2007.01)

(52) U.S. Cl.
CPC ............ *H02M 3/158* (2013.01); *H02H 7/008* (2013.01); *H02M 1/32* (2013.01)

(58) Field of Classification Search
CPC ........ H02M 3/158; H02M 7/008; H02M 1/32; H02M 1/0009
See application file for complete search history.

(56) References Cited

U.S. PATENT DOCUMENTS

2012/0195620 A1* 8/2012 Matsumoto ............ G03G 15/80
                                                            399/88
2014/0192449 A1* 7/2014 Shimizu .................. H02M 1/36
                                                            361/93.1
(Continued)

FOREIGN PATENT DOCUMENTS

JP    2003-270275 A    9/2003
JP    2006-296159 A    10/2006
(Continued)

OTHER PUBLICATIONS

International Search Report and Written Opinion dated Apr. 16, 2019 for PCT/JP2019/009914 filed on Mar. 12, 2019, 9 pages including English Translation of the International Search Report.

(Continued)

*Primary Examiner* — Rafael O De Leon Domenech
(74) *Attorney, Agent, or Firm* — Xsensus LLP

(57) ABSTRACT

A power semiconductor device protection circuit includes: a drive circuit that drives a power semiconductor device; a current detector which includes a first resistor and an inductor connected in parallel; and a detection circuit that detects a short-circuit condition of the power semiconductor device. One end of the first resistor and one end of the inductor are connected to one terminal of the power semiconductor device. The detection circuit detects the short-circuit condition of the power semiconductor device by comparing a voltage of the one terminal of the power semiconductor device, which changes as a function of current flow through the first resistor and the inductor, with a short-circuit detec- (Continued)

tion voltage. A reference potential of the drive circuit is connected to the other end of the first resistor and the other end of the inductor.

16 Claims, 11 Drawing Sheets

(56) References Cited

U.S. PATENT DOCUMENTS

| | | | |
|---|---|---|---|
| 2015/0222183 A1* | 8/2015 | Karlsson | H02M 3/156 323/271 |
| 2016/0164412 A1* | 6/2016 | Li | G01R 31/40 323/299 |
| 2016/0211657 A1* | 7/2016 | Hayashi | H03K 17/0828 |
| 2017/0126115 A1 | 5/2017 | Schulz et al. | |
| 2018/0205372 A1* | 7/2018 | Sasaki | H03K 17/168 |
| 2019/0027922 A1 | 1/2019 | Johansson et al. | |
| 2020/0144998 A1* | 5/2020 | Inoue | H03K 17/0828 |

FOREIGN PATENT DOCUMENTS

| | | |
|---|---|---|
| JP | 2007-259533 A | 10/2007 |
| JP | 2013-231601 A | 11/2013 |
| WO | 2017/127013 A1 | 7/2017 |

OTHER PUBLICATIONS

Office Action dated Mar. 28, 2022, in corresponding Chinese patent Application No. 201980032945.2, 19 pages.

* cited by examiner

FIG.13

| INPUT | | OUTPUT | | | |
|---|---|---|---|---|---|
| Vs1 | Vs2 | Vsc | Err0 | Err1 | Err2 |
| L | L | H | L | L | L |
| L | H | L | H | L | H |
| H | L | L | H | H | L |

POWER SEMICONDUCTOR DEVICE PROTECTION CIRCUIT AND POWER MODULE

CROSS-REFERENCE TO RELATED APPLICATIONS

The present application is based on PCT filing PCT/JP2019/009914, filed Mar. 12, 2019, which claims priority to JP 2018-098620, filed May 23, 2018, the entire contents of each are incorporated herein by reference.

TECHNICAL FIELD

The present disclosure relates to a power semiconductor device protection circuit and a power module.

BACKGROUND ART

A power semiconductor device capable of controlling a high power is used in a power supply circuit that generates, from a direct-current (DC) or an alternating-current (AC), AC having a different frequency or in a power conversion device having such a power supply circuit. Use of the power semiconductor device in the power conversion device requires a short-circuit protection circuit to prevent the power semiconductor device from being destroyed by the short-circuit current in the event of an arm short circuit or a load short circuit.

The short-circuit protection circuit included in the power semiconductor device measures a current flow through the power semiconductor device or a voltage applied to the power semiconductor device, and, if the measurement exceeds a predetermined value, limits or interrupts the short-circuit current to prevent destruction of the power semiconductor device.

PTL 1 discloses a power semiconductor device protection circuit. The protection circuit uses a shunt resistor to detect the current flow through a power semiconductor device, shown in FIG. 6.

CITATION LIST

Patent Literature

PTL 1: Japanese Patent Laying-Open No. 2007-259533

SUMMARY OF INVENTION

Technical Problem

When the shunt resistor is used as a current sensing means to protect the semiconductor device, as shown in FIG. 6 of PTL 1, the current flows through the shunt resistor even in normal operation. This causes power loss.

Therefore, the present disclosure is made to solve problems as the above and an object of the present disclosure is to provide a power semiconductor device protection circuit and a power module which can reduce the power loss.

Solution to Problem

A power semiconductor device protection circuit according to the present disclosure includes: a drive circuit that drives a power semiconductor device; a current detector which includes a first resistor and an inductor connected in parallel; and a detection circuit that detects a short-circuit condition of the power semiconductor device. One end of the first resistor and one end of the inductor are connected to one terminal of the power semiconductor device. The detection circuit detects the short-circuit condition of the power semiconductor device by comparing a voltage of the one terminal of the power semiconductor device, which changes as a function of current flow through the first resistor and the inductor, with a short-circuit detection voltage. A reference potential of the drive circuit is connected to the other end of the first resistor.

Advantageous Effects of Invention

According to the present disclosure, the current detector includes the first resistor and the inductor connected in parallel, and the reference potential of the drive circuit is connected to the other end of the first resistor and the other end of the inductor, thereby reducing the power loss.

BRIEF DESCRIPTION OF DRAWINGS

FIG. 13 is a truth table for determination circuit 11 according to Embodiment 6.

DESCRIPTION OF EMBODIMENTS

Embodiment 1

Figure 1:
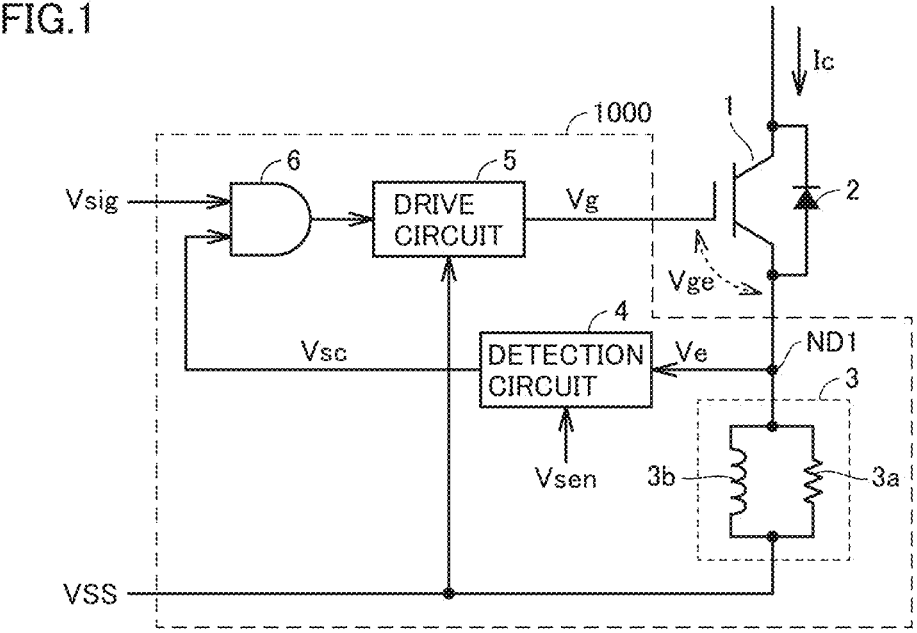
FIG. 1 is a diagram showing a power semiconductor device protection circuit 1000 according to Embodiment 1.

FIG. 1 is a diagram showing a power semiconductor device protection circuit 1000 according to Embodiment 1.

As shown in FIG. 1, protection circuit 1000 for a power semiconductor device 1 includes a drive circuit 5, a current detector 3, a detection circuit 4, and an interruption unit 6.

Power semiconductor device 1 is an IGBT (Insulated Gate Bipolar Transistor) formed on a Si substrate. Power semiconductor device 1 may be a MOSFET (Metal Oxide Semiconductor Field Effect Transistor) or a BIPOLAR transistor. Power semiconductor device 1 may be a power semiconductor device formed on a SiC (Silicon Carbide) substrate or a power semiconductor device formed on a GaN (Gallium Nitride) substrate. Power semiconductor device 1 is not limited thereto, insofar as it is a semiconductor device that is used for power.

A diode 2 is connected in anti-parallel to power semiconductor device 1. Power semiconductor device 1 has the emitter terminal connected to a node ND1.

Drive circuit 5 drives power semiconductor device 1. Drive circuit 5 is configured of, for example, an inverter which includes a PMOS transistor and an NMOS transistor.

Current detector 3 includes a first resistor 3a and an inductor 3b connected in parallel. One end of first resistor 3a and one end of inductor 3b are connected to node ND1. Node ND1 is connected to the emitter terminal of power semiconductor device 1 and an input of detection circuit 4. The other end of first resistor 3a and the other end of inductor 3b are connected to a reference potential VSS. The difference between the voltage of node ND1, that is, the voltage of the emitter terminal of power semiconductor device 1 and reference potential VSS (hereinafter, an emitter voltage) changes as a function of the current flow through first resistor 3a and inductor 3b.

Detection circuit 4 compares the voltage of node ND1, which changes as a function of the current flow through first resistor 3a and inductor 3b, that is, an emitter voltage Ve of power semiconductor device 1 with the magnitude of a predetermined short-circuit detection voltage Vsen, thereby detecting a short circuit state of power semiconductor device 1. If emitter voltage Ve is less than or equal to short-circuit detection voltage Vsen, detection circuit 4 determines that power semiconductor device 1 is in a normal state. If emitter voltage Ve exceeds short-circuit detection voltage Vsen, detection circuit 4 determines that power semiconductor device 1 is in a short circuit state. If determined that power semiconductor device 1 is in a normal state, detection circuit 4 sets a state determination signal Vsc to high. If determined that power semiconductor device 1 is in a short circuit state, detection circuit 4 sets state determination signal Vsc to low.

Based on state determination signal Vsc, interruption unit 6 interrupts a control signal Vsig to be input to drive circuit 5. Interruption unit 6 is configured by, for example, an AND circuit which receives control signal Vsig to be input to drive circuit 5, and state determination signal Vsc. Interruption unit 6 can be built in drive circuit 5. If state determination signal Vsc is high, the AND circuit outputs control signal Vsig. If state determination signal Vsc is low, the AND circuit outputs a constant value "0" (low), without outputting control signal Vsig. Interruption unit 6 is not limited to the AND circuit, and may be any insofar as it has the functionality of interrupting a drive voltage Vg output from drive circuit 5, based on state determination signal Vsc.

Drive circuit 5 outputs drive voltage Vg, according to control signal Vsig output from interruption unit 6. Drive circuit 5 does not output drive voltage Vg if the output of interruption unit 6 is low. Drive circuit 5 has a reference potential connected to the other end of first resistor 3a, the other end of inductor 3b, and reference potential VSS. If drive circuit 5 is configured of an inverter, the potential, to which the source of an NMOS transistor included in the inverter is connected, corresponds to the reference potential of drive circuit 5.

Figure 2:
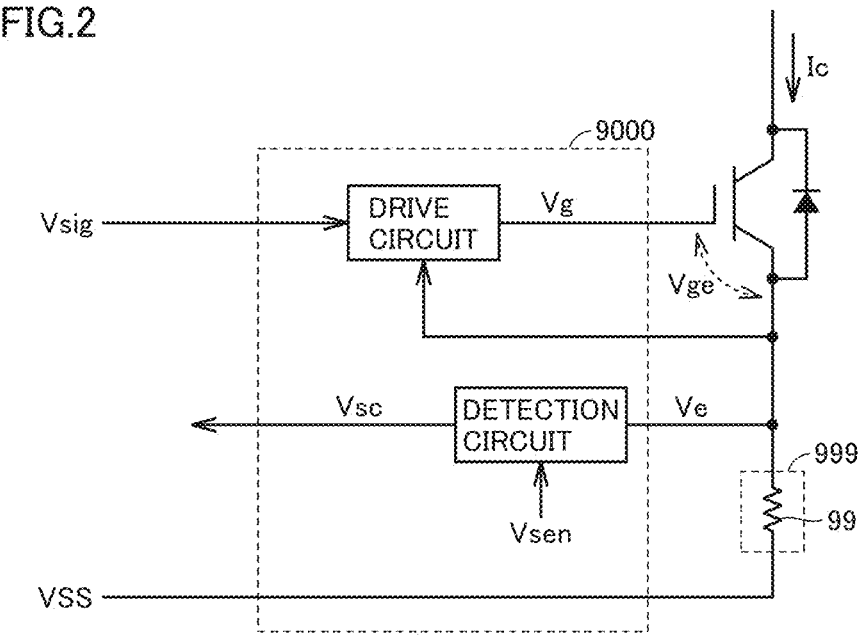
FIG. 2 is a diagram showing a power semiconductor device protection circuit 9000 according to Conventional Example.

FIG. 2 is a diagram showing a power semiconductor device protection circuit 9000 according to Conventional Example. Protection circuit 9000 of Conventional Example includes a current detector 999 which is configured of only a resistor 99 as a general short-circuit detection means.

An operation of Embodiment 1 when power semiconductor device 1 is in a normal state (not short-circuited) is now described.

Figure 3:
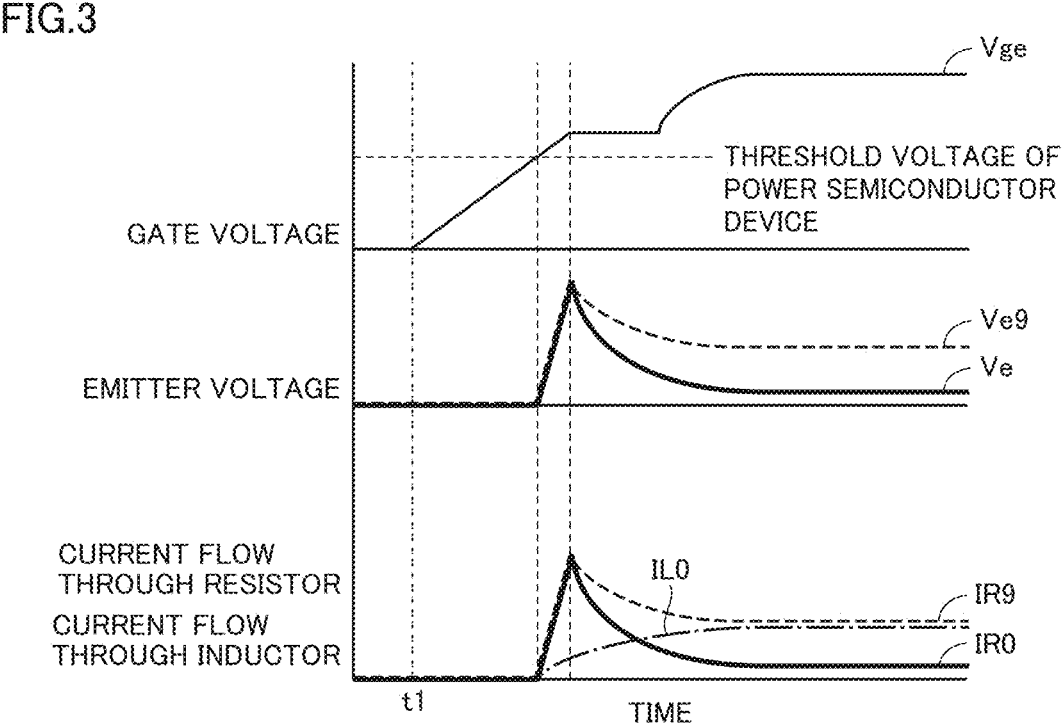
FIG. 3 is a diagram showing example operations of protection circuit 1000 according to Embodiment 1 and protection circuit 9000 according to Conventional Example in a normal state (when the power semiconductor device is not short-circuited).

FIG. 3 is a diagram showing example operations of protection circuit 1000 according to Embodiment 1 and protection circuit 9000 according to Conventional Example when power semiconductor device 1 is in a normal state (not short-circuited).

In FIG. 3, Vge represents the gate voltage of power semiconductor device 1 in Conventional Example and Embodiment 1. Ve9 represents the emitter voltage of power semiconductor device 1 in Conventional Example and Ve represents the emitter voltage of power semiconductor device 1 in Embodiment 1. IR9 represents the current flow through resistor 99 within current detector 999 in Conventional Example, IR0 represents the current flow through first resistor 3a within current detector 3 in Embodiment 1, and IL0 represents the current flow through inductor 3b within current detector 3 in Embodiment 1.

In normal operation (when power semiconductor device 1 is not short-circuited) gate voltage Vge of power semiconductor device 1 increases and power semiconductor device 1 turns on when gate voltage Vge exceeds a threshold voltage for power semiconductor device 1. This allows current Ic to flow through power semiconductor device 1, and, accordingly, current IR0 flows through first resistor 3a in Embodiment 1. Current IL0 flow through inductor 3b also increases with the first-order lag. Current Ic flow through power semiconductor device 1 is equal to the current flow through current detector 3. In Embodiment 1, after the current is saturated in power semiconductor device 1, a reduction in current IR0 flow into first resistor 3a is significant since current IL is flowing through inductor 3b. As a result, the power loss in first resistor 3a decreases.

In Conventional Example, in contrast, the entirety of current Ic flow through power semiconductor device 1 flows into resistor 99 within current detector 999. Thus, even after the current is saturated in power semiconductor device 1, a reduction in current IR9 flow into resistor 99 within current detector 999 is not significant. As a result, in Conventional Example, a greater power loss is caused at resistor 99 within current detector 999, as compared to Embodiment 1.

As the above, protection circuit 1000 for power semiconductor device 1 according to Embodiment 1 can reduce the power loss when power semiconductor device 1 is in normal operation (not short-circuited), as compared to protection circuit 9000 according to Conventional Example. Moreover, where current detector 3 allows the same power loss as Conventional Example, the resistance of first resistor 3a within current detector 3 according to Embodiment 1 can be greater than the resistance of resistor 99 within current detector 999 according to Conventional Example. As a result, in the present embodiment, the detection voltage (Ve) in the event of a short circuit is increased, allowing highly accurate detection of occurrence of a short circuit.

Next, an operation of Embodiment 1 when power semiconductor device 1 is short circuited is described.

Figure 4:
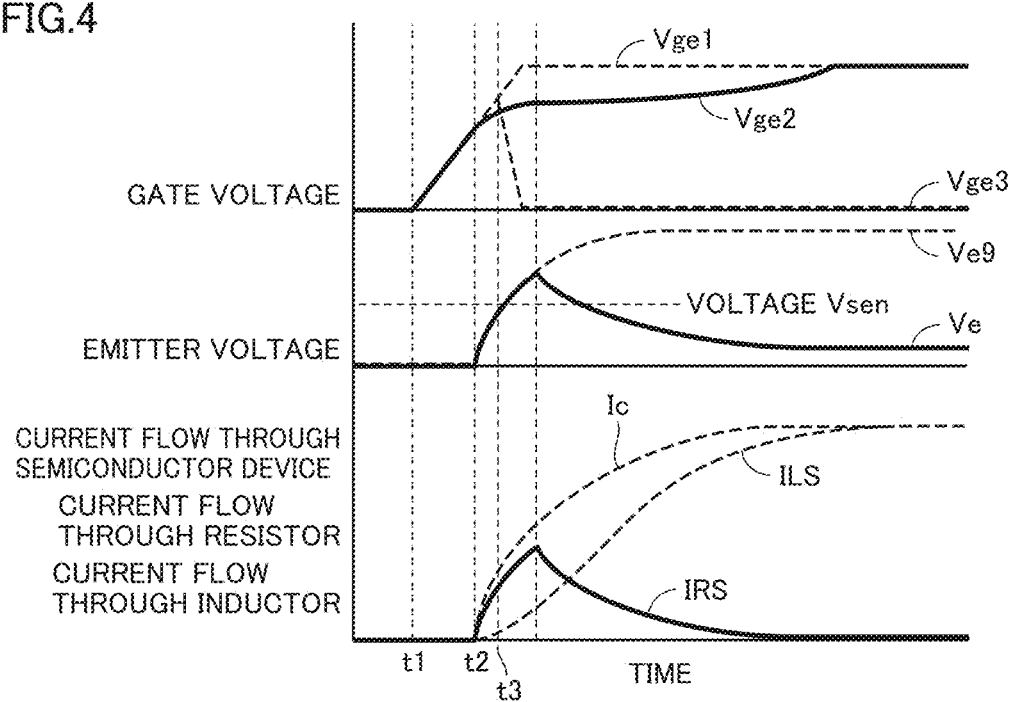
FIG. 4 is a diagram showing example operations of protection circuit 1000 according to Embodiment 1 and protection circuit 9000 according to Conventional Example when the power semiconductor device is short-circuited.

FIG. 4 is a diagram showing example operations of protection circuit 1000 according to Embodiment 1 and protection circuit 9000 according to Conventional Example.

In FIG. 4, Vge1 represents the gate voltage when drive circuit 5 is not interrupted in Conventional Example, Vge2 represents the gate voltage when drive circuit 5 is not interrupted in Embodiment 1, and Vge3 represents the gate voltage when drive circuit 5 is interrupted in Embodiment 1.

Ve9 represents the emitter voltage of power semiconductor device 1 in Conventional Example, and Ve represents the emitter voltage of power semiconductor device 1 in Embodiment 1. IRS represents the current flow through first resistor 3a within current detector 3 in Embodiment 1, ILS represents the current flow through inductor 3b within current detector 3 in Embodiment 1, and Ic represents the current flow through power semiconductor device 1.

As shown in FIG. 4, as an overcurrent flows through power semiconductor device 1 and a short-circuiting operation occurs at time t1, current Ic flow through power semiconductor device 1 increases at time t2. In Embodiment 1, since current detector 3 is configured of first resistor 3a and inductor 3b connected in parallel, the voltage drops at first resistor 3a and inductor 3b are equal. Current Ic which flows through power semiconductor device 1 when power semiconductor device 1 is short-circuited is shunt by first resistor 3a and inductor 3b.

Since a current change dIc/dt in the current flow through power semiconductor device 1 is large, current ILS flow through inductor 3b is small, allowing the majority of current Ic to flow into first resistor 3a. As current IRS flows through first resistor 3a, emitter voltage Ve of power semiconductor device 1 increases. Similarly in Conventional Example, current Ic flows into resistor 99 within current detector 999, and emitter voltage Ve9 of power semiconductor device 1 thus increases.

At time t3, in Embodiment 1, detection circuit 4 determines that power semiconductor device 1 is short-circuited if emitter voltage Ve matches short-circuit detection voltage Vsen, and sets state determination signal Vsc to low. This causes interruption unit 6 to interrupt the control signal Vsig directed to drive circuit 5. As a result, gate voltage Vge3 of power semiconductor device 1 decreases. As gate voltage Vge3 of power semiconductor device 1 decreases close to zero, emitter voltage Ve of power semiconductor device 1 decreases. Accordingly, current IRS flow through first resistor 3a decreases. Current ILS flow through inductor 3b, on the other hand, gradually increases with the first-order lag.

In Conventional Example, in order to reduce the power loss, the resistance of resistor 99 within current detector 999 needs to be reduced. Reducing the resistance of resistor 99 reduces the detection voltage in the event of a short circuit as a trade-off, resulting in reduced detection accuracy. In contrast, increasing the resistance of resistor 99 increases the detection voltage, which increases the detection accuracy, while causing a large loss when power semiconductor device 1 is in a normal state.

In Embodiment 1, if a large current change dIc/dt is caused in power semiconductor device 1 in the event of a short circuit, initially, the current flows through first resistor 3a, and the current then commutates to inductor 3b with the first-order lag.

In Embodiment 1, similarly, in normal operation, after current Ic flow through power semiconductor device 1 has reached a current that is determined by the load and the supply voltage, dIc/dt decreases. Therefore, the current flew through first resistor 3a flows through inductor 3b with the first-order lag. In other words, the current flows through first resistor 3a only briefly while the current change dIc/dt of the current flow through power semiconductor device 1 is large. Thus, the power loss at first resistor 3a can be reduced. This allows significant reduction of the power loss caused by first resistor 3a. Moreover, application of a large resistance to first resistor 3a can increase the detection voltage in the event of a short circuit, thereby increasing the detection accuracy.

In Embodiment 1, in order to prevent false detection by the protection circuit attributed to emitter voltage Ve of current detector 3 in the event of a short circuit, short-circuit detection voltage Vsen in the event of a short circuit needs to be set greater than emitter voltage Ve when current Ic flows through power semiconductor device 1 in normal operation.

Emitter voltage Ve in normal operation is also susceptible to a change dIL0/dt in current flow through inductor 3b. If the impedance of inductor 3b is lower than first resistor 3a, current Ic flow through power semiconductor device 1 flows into inductor 3b. As a result, change dIL0/dt in the current flow through inductor 3b increases, which increases emitter voltage Ve. If emitter voltage Ve exceeds short-circuit detection voltage Vsen, detection circuit 4 falsely detects that power semiconductor device 1 is short-circuited. For this reason, the impedance of inductor 3b needs to be set higher than the impedance of first resistor 3a.

When the impedance of inductor 3b is set higher than the impedance of first resistor 3a, the short-circuit current at a moment of occurrence of a short circuit substantially flows into first resistor 3a. Thus, emitter voltage Ve of power semiconductor device 1 is dominated by the voltage drop (R3×IRS) of first resistor 3a. Here, R3 refers to the resistance value of first resistor 3a, and IRS refers to the current flow through first resistor 3a. Current Ic that flows through power semiconductor device 1 is shunt by first resistor 3a and inductor 3b when power semiconductor device 1 is short-circuited. Since first resistor 3a and inductor 3b are connected in parallel, the voltage drop (R3×IRS) at first resistor 3a and the induced electromotive force (L×dILS/dt) generated at inductor 3b are both equal to emitter voltage Ve of power semiconductor device 1. L refers to the inductance of inductor 3b, and ILS refers to the current flow through inductor 3b.

From the above, in the present embodiment, in order to accurately detect the state of power semiconductor device 1 when short circuited, without malfunctioning, the impedance of inductor 3b needs to be set higher than first resistor 3a, and short-circuit detection voltage Vsen, the induced electromotive force caused at inductor 3b, and the voltage drop of first resistor 3a in the event of short-circuit need to be set to meet the relationship in Equation (1). Here, a potential used a reference for Equation (1) is VSS connected to the reference potential of drive circuit 5, and VSS connected to the other end of first resistor 3a and the other end of inductor 3b.

$$Ve = L \times dILS/dt = R3 \times IRS > V\text{sen} > R3 \times IR0 \qquad (1)$$

In Equation (1), ILS denotes the current which flows through inductor 3b in the event of short circuit, IRS denotes the current which flows through first resistor 3a in the event of short circuit, and IR0 denotes the current which flows through first resistor 3a in normal operation. L×dILS/dt represents induced electromotive force that is caused at inductor 3b in the event of a short circuit. R3×IRS represents the voltage drop of first resistor 3a in the event of a short circuit. R3×IR0 represent the voltage drop of first resistor 3a in a normal state.

Furthermore, in the present embodiment, since the reference potential of drive circuit 5 is connected to the other end of first resistor 3a, the other end of inductor 3b, and reference potential VSS, voltage Vge applied to the control terminal (gate) of power semiconductor device 1 is a voltage obtained by subtracting emitter voltage Ve from drive voltage Vg of drive circuit 5.

Accordingly, while emitter voltage Ve is increased by the current flowing through first resistor 3a in the event of a short circuit, voltage Vge applied to the control terminal of power semiconductor device 1 can be limited. In other words, the negative feedback effect can be provided in which the peak value of the short-circuit current is constrained by power semiconductor device 1. As a result, the saturation current value of power semiconductor device 1, that is, the short-circuit current value can be kept low. This can limit the power, applied to power semiconductor device 1, to be small. Accordingly, a time after the occurrence of short circuit and before power semiconductor device 1 is destroyed can be prolonged. Thus, power semiconductor device 1 can be prevented from being destroyed even if a time taken to interrupt the drive circuit 5 since the detection of the short-circuit condition is delayed by a filter or the like for avoiding the false detection. Moreover, since the power applied to power semiconductor device 1 when short-circuited can be limit to be small, a small short circuit capability, that is, a small power semiconductor device 1 can be used as well.

In the present embodiment, the power loss in a normal state (when power semiconductor device 1 is not short-circuited) can be reduced, as compared to a protection circuit which includes a short-circuit detection means using a general resistor. The detection accuracy can be improved by increasing the detection voltage in the event of a short circuit, while reducing the power loss in normal operation.

Moreover, in the present embodiment, since the reference potential of drive circuit 5 is connected to the other end of first resistor 3a, the other end of inductor 3b, and reference potential VSS, the negative feedback effect of constraining voltage Vge applied to the control terminal of power semiconductor device 1 can be provided. This allows the magnitude of the short-circuit current to be limited to be small, thereby reducing the power applied to power semiconductor device 1 when the power semiconductor device 1 is short-circuited. As a result, power semiconductor device 1 can be prevented from being destroyed.

The protection circuit shown in FIG. 1 of PTL 1 includes a power semiconductor device current sensing means, and a voltage sensing means which detects the voltage of the control terminal of the power semiconductor device. The protection circuit prevents the power semiconductor device from being destroyed by controlling the voltage of the control terminal with the output signal of the current sensing means and the output signal of the voltage sensing means. As shown in FIG. 1 of PTL 1, the circuit size of the protection circuit is increased when the power semiconductor device is protected with the signal from the current sensing means and the signal from the voltage sensing means. The protection circuit according to the present embodiment, in contrast, protects the power semiconductor device with the signal from the current sensing means. Thus, the circuit size of the protection circuit is small.

Figure 5:
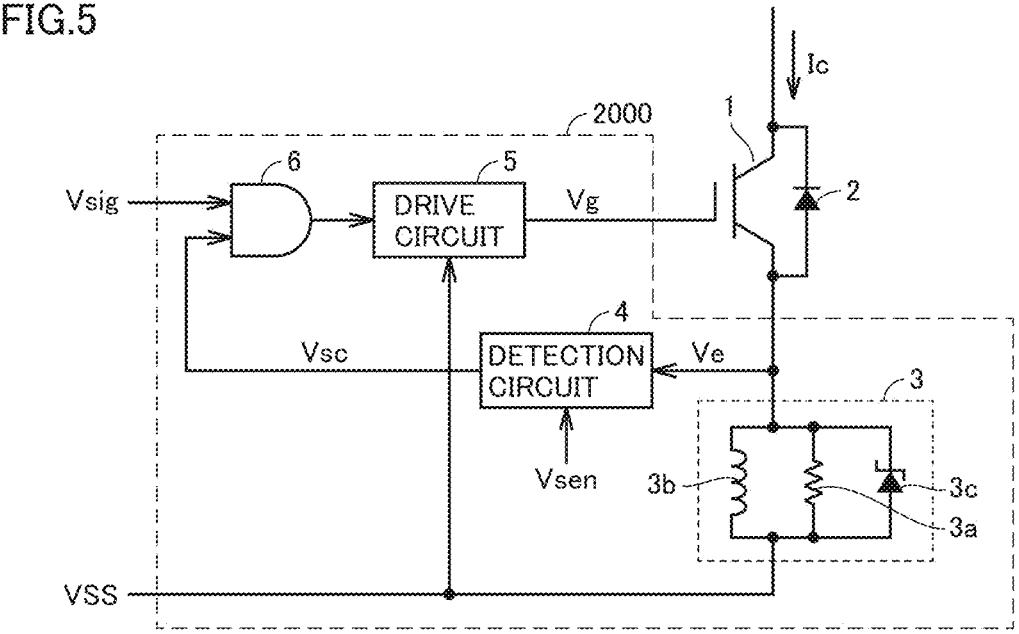
FIG. 5 is a diagram showing a power semiconductor device protection circuit 2000 according to Embodiment 2.

The protection circuit shown in FIG. 5 of PTL 1 uses a current transformer to detect the current. The use of current transformer for the detection of current increases the current detection accurately, but increases the cost. The protection circuit according to the present embodiment, in contrast, does not use a current transformer to detect the current.

Figure 6:
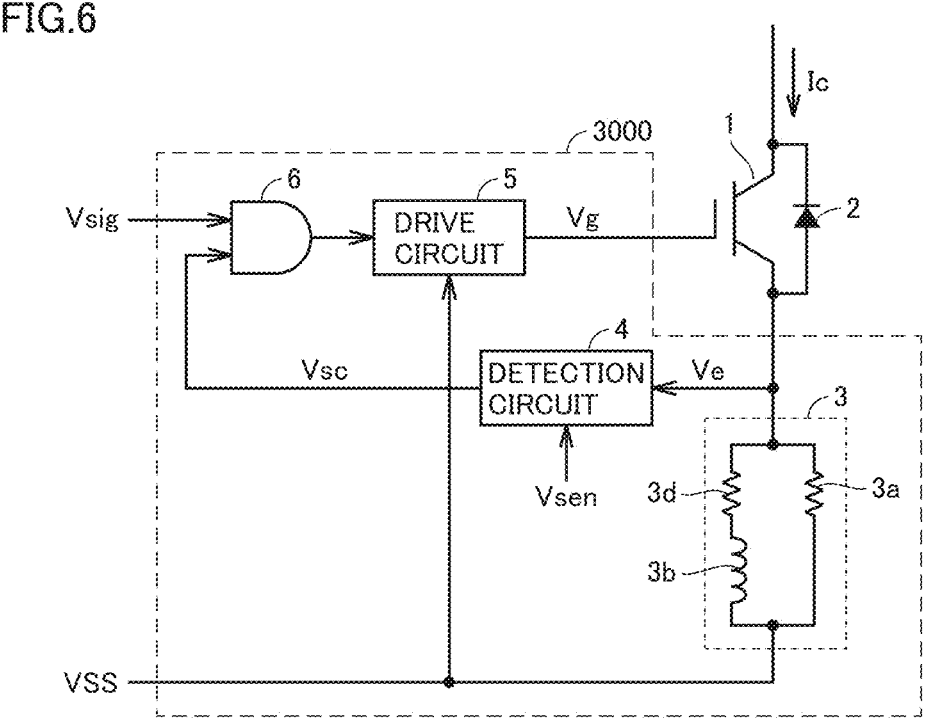
FIG. 6 is a diagram showing a power semiconductor device protection circuit 3000 according to Embodiment 3.

The protection circuit shown in FIG. 6 of PTL 1 uses the current sensing means by a shunt resistor to protect the power semiconductor device. The protection circuit allows the current to flow through the shunt resistor even in normal operation. This causes power loss. Moreover, in order to satisfy the power capacity of the shunt resistor, only a relatively small power conversion device is applicable. The protection circuit according to the present embodiment, in contrast, does not use the shunt resistor to protect the power semiconductor device.

Figure 7:
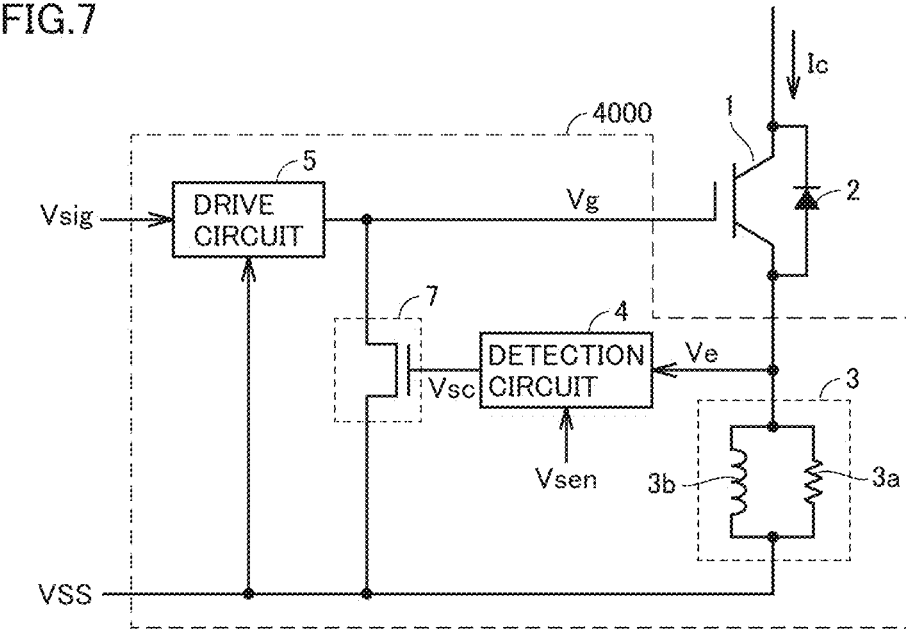
FIG. 7 is a diagram showing a power semiconductor device protection circuit 4000 according to Embodiment 4.

The protection circuit shown in FIG. 7 of PTL 1 uses a shunt resistor to detect the current from a sense terminal of an IGBT. A sense cell is required within the power semiconductor device (IGBT), resulting in an increased cost for the power semiconductor device. The protection circuit according to the present embodiment, in contrast, is not required to have a sense cell within the power semiconductor device (IGBT).

Figure 8:
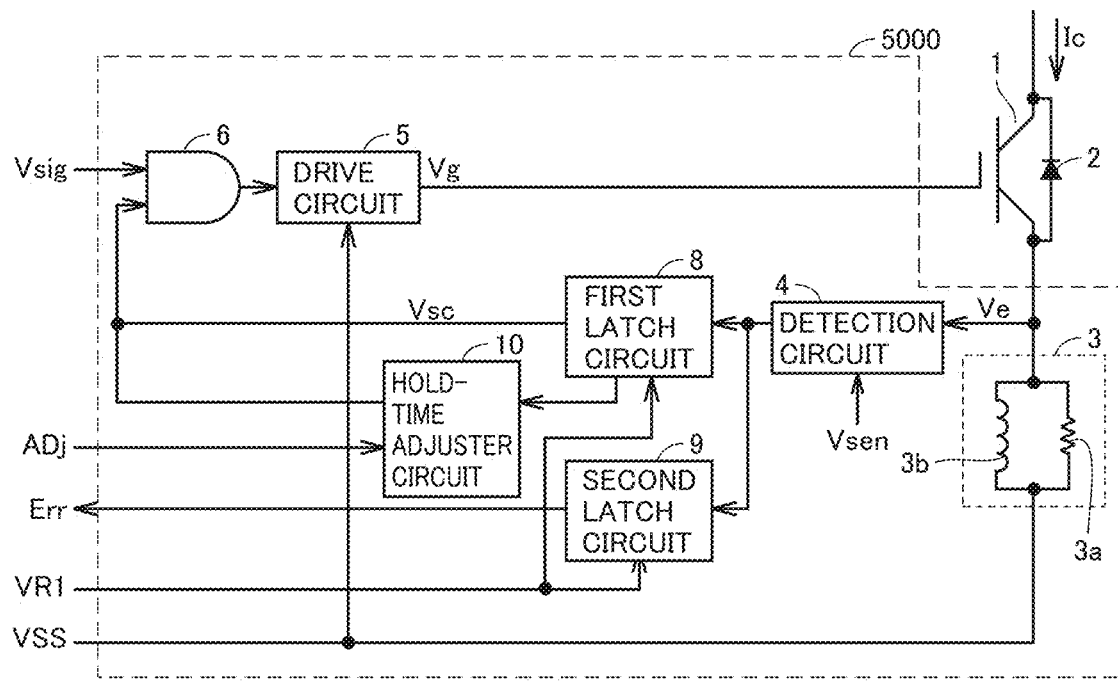
FIG. 8 is a diagram showing a power semiconductor device protection circuit 5000 according to Embodiment 5.

The protection circuit shown in FIG. 8 of PTL 1 uses only an inductor to detect the current. An integrator is required to detect the current using only the inductor, resulting in an increased size of the protection circuit. The protection circuit according to the present embodiment, in contrast, does not use the inductor only to detect the current.

Embodiment 2

FIG. 5 is a diagram showing a power semiconductor device protection circuit 2000 according to Embodiment 2. Protection circuit 2000 according to Embodiment 2 is different from protection circuit 1000 according to Embodiment 1 in that current detector 3 according to Embodiment 2 further includes a Zener diode 3c.

Zener diode 3c is connected in parallel to first resistor 3a and inductor 3b. The addition of Zener diode 3c yields the following two advantageous effects.

The first advantageous effect is now described. If a current change dIc/dt has occurred in power semiconductor device 1 when power semiconductor device 1 is short-circuited, a voltage drop occurs at inductor 3b which is multiplication of an inductance L of inductor 3b and current change dIL/dt. At this time, gate voltage Vge of power semiconductor device 1 is reduced by the voltage drop occurred at inductor 3b, and current change dIc/dt of power semiconductor device 1 decreases. The reduction of current change dIc/dt of power semiconductor device 1 reduces current change dIL/dt of inductor 3b. Thus, the voltage drop occurred at inductor 3b is reduced, and gate voltage Vge of power semiconductor device 1 increases. The increase in gate voltage Vge increases current change dIc/dt of power semiconductor device 1, and the voltage drop of inductor 3b increases as well.

As such, due to the voltage drop occurred at inductor 3b in the event of a short circuit, oscillation phenomenon may be caused in which an increase and a decrease of gate voltage Vge of power semiconductor device 1 repeat.

In Embodiment 2, since current detector 3 according to Embodiment 1 includes Zener diode 3c, the maximum value of emitter voltage Ve of power semiconductor device 1 can be capped at a value of the breakdown voltage of Zener diode 3c. Capping the maximum value of emitter voltage Ve of power semiconductor device 1 can prevent the oscillation phenomenon of power semiconductor device 1 that is caused by a voltage drop occurred at current detector 3. This is the first advantageous effect. Preferably, the breakdown voltage value of Zener diode 3c is set higher that short-circuit detection voltage Vsen that is set at first resistor 3a in the event of a short circuit.

The second advantageous effect is that power semiconductor device 1 can be prevented from turning on when the regeneration current flows through power semiconductor device 1 in the direction from the emitter terminal to the collector terminal in the normal operation.

If the regeneration current flows through power semiconductor device 1, the current flows power semiconductor device 1 in a direction from the emitter terminal to the collector terminal. In Embodiment 1, emitter voltage Ve of power semiconductor device 1 decreases lower than reference potential VSS of drive circuit 5. As a result, even though an off control signal Vsig is input to drive circuit 5, power semiconductor device 1 changes from off to on as gate voltage Vge of power semiconductor device 1 increases. For example, when off control signal Vsig is input to power semiconductor device 1 on the N side (the lower arm) of the power converter and an on control signal is input to power semiconductor device 1 on the P side (the upper arm), power semiconductor device 1 on the N side is short-circuited if turned on by the regeneration current.

In Embodiment 2, Zener diode 3c is connect in parallel to first resistor 3a and inductor 3b. The magnitude of the negative voltage of emitter voltage Ve of power semiconductor device 1 is limited by the forward voltage drop of Zener diode 3c to prevent power semiconductor device 1 from falsely turning on.

Here, preferably, the voltage value of the forward voltage drop of Zener diode 3c when the maximum value of the return current flow through power semiconductor device 1 flows through Zener diode 3c is set lower than a threshold voltage of power semiconductor device 1.

As described above, since current detector 3 includes first resistor 3a, inductor 3b, and Zener diode 3c connected in parallel, the oscillation phenomenon of the power semiconductor device can be prevented, which is caused by the voltage drop at inductor 3b caused by the breakdown voltage of Zener diode 3c. Moreover, the magnitude of the negative voltage of emitter voltage Ve of power semiconductor device 1 can be limited by the forward voltage drop of Zener diode 3c, thereby preventing power semiconductor device 1 from falsely turning on.

Note that the magnitude of the negative voltage caused by the return current can be reduced even smaller by adding, in parallel with Zener diode 3c, a diode (e.g., a Schottky diode) having a voltage value less than the forward voltage drop.

Embodiment 3

FIG. 6 is a diagram showing a power semiconductor device protection circuit 3000 according to Embodiment 3. Protection circuit 3000 according to Embodiment 3 is different from protection circuit 1000 according to Embodiment 1 in that current detector 3 according to Embodiment 3 further includes a second resistor 3d.

Second resistor 3d is connected in series to inductor 3b. The addition of second resistor 3d yields the following two advantageous effects.

The first advantageous effect is that emitter voltage Ve of power semiconductor device 1 can be tuned using second resistor 3d in the event of a short circuit of power semiconductor device 1. This can allows an increased detection accuracy.

While the load, connected to a power supply circuit or power conversion device (inverter) which includes power semiconductor device 1, is short-circuited, the parasitic inductance within a power module which includes power semiconductor device 1 or within an inductor of an external wiring connected to the power supply terminal of the power module, increases. As a result, current change dIc/dt in current Ic flow through power semiconductor device 1 decreases. This also decreases current change dIL/dt in current IL flow through inductor 3b of current detector 3 included in the power semiconductor device protection circuit. The reduction of current change dIL/dt reduces emitter voltage Ve of power semiconductor device 1 when short-circuited, as shown in Equation (1) shown in Embodiment 1. Accordingly, short-circuit detection voltage Vsen in the event of a short circuit needs to be reduced. If short-circuit detection voltage Vsen is reduced, a short circuit may be falsely detected due to noise, for example.

In Embodiment 3, second resistor 3d is added in series to inductor 3b of current detector 3, and a voltage drop (R3d×I3d) is thereby caused at second resistor 3d. R3a represents the resistance of first resistor 3a, R3d represents the resistance of second resistor 3d, and I3d represents the current flow through second resistor 3d. Emitter voltage Ve of power semiconductor device 1 can be tuned by tuning resistance R3d, thereby increasing the detection accuracy. In Embodiment 3, conditions for accurately detecting the state of power semiconductor device 1 when short circuited, are varied as:

$$Ve = R3d \times I3d + L \times dILS/dt = R3a \times IRS > Vsen > R3a \times IR0 \qquad (2)$$

The second advantageous effect is that the negative feedback effect of limiting the voltage Vge applied to the control terminal of power semiconductor device 1 in the event of a short circuit, can be enhanced higher than Embodiment 1. This limits short-circuit current Ic flow through power semiconductor device 1, thereby limiting the power applied to power semiconductor device 1 to be even smaller.

In Embodiment 3, emitter voltage Ve of power semiconductor device 1 can be tuned by tuning the resistance of second resistor 3d as mentioned above. In other words, the negative feedback effect of limiting the voltage Vge applied to the control terminal of power semiconductor device 1 can be more enhanced by emitter voltage Ve of power semiconductor device 1 in the event of a short circuit being increased higher than Embodiment 1, as shown in Equation (2). As a result, in Embodiment 3, short-circuit current Ic flow through power semiconductor device 1 is limited more than Embodiment 1. This can limit the power applied to power semiconductor device 1 to be even smaller. Note that the power loss occurred at second resistor 3d in normal operation increases as a trade-off. Thus, the resistance of second resistor 3d needs to set while balancing the power loss in normal operation and the limit of power applied to power semiconductor device 1 in the event of a short circuit.

As described above, the power semiconductor device protection circuit according to Embodiment 3, since it includes second resistor 3d in series to inductor 3b included in current detector 3 according to Embodiment 1 and is thereby able to tune emitter voltage Ve of power semiconductor device 1 in the event of a short circuit, allows improved detection accuracy. Furthermore, tuning emitter voltage Ve enhances the negative feedback effect of limiting the voltage Vge applied to the control terminal of power semiconductor device 1. As a result, short-circuit current Ic flow through power semiconductor device 1 is limited, thereby limiting the power applied to power semiconductor device 1 to be even smaller.

While FIG. 6 shows inductor 3b having the other end connected to reference potential VSS, the present disclosure is not limited thereto. The same advantageous effects is provided by switching the positions of inductor 3b and second resistor 3d, connecting the one end of inductor 3b to the emitter terminal of the power semiconductor device, connecting the one end of second resistor 3d to the other end of inductor 3b, and connecting the other end of second resistor 3d to reference potential VSS.

Embodiment 4

FIG. 7 is a diagram showing a power semiconductor device protection circuit 4000 according to Embodiment 4.

Protection circuit 4000 according to Embodiment 4 is different from protection circuit 1000 according to Embodiment 1 in that protection circuit 4000 includes an interruption unit 7, instead of interruption unit 6.

Interruption unit 7 is disposed between (i) an output of a drive circuit 5 and (ii) the other end of a first resistor 3a and the other end of an inductor 3b. In accordance with a state determination signal Vsc output from a detection circuit 4, interruption unit 7 connects the other end of first resistor 3a, inductor 3b, and reference potential VSS to the output of drive circuit 5 or disconnects the connection between them.

Interruption unit 7 is configured of, for example, a MOS (Metal Oxide Semiconductor) transistor, a bipolar transistor, or an RTC (Real Time Control) circuit. Interruption unit 7 is not limited thereto insofar as it is a means that connects the other end of first resistor 3a, inductor 3b, and reference potential VS S to the output of drive circuit 5 or disconnects the connection between them, using state determination signal Vsc.

As shown in FIG. 7, as interruption unit 7 is turned on by state determination signal Vsc output from detection circuit 4 in the event of a short circuit, drive voltage Vg output from drive circuit 5 is reduced to reference potential VSS. This controls gate voltage Vge applied to power semiconductor device 1, thereby preventing power semiconductor device 1 from being destroyed. If interruption unit 7 is configured of an NMOS transistor, detection circuit 4 may set state determination signal Vsc to low if determined that power semiconductor device 1 is in a normal state, and set state determination signal Vsc to high if determined that power semiconductor device 1 is short-circuited.

Compared to Embodiment 1, gate voltage Vge applied to power semiconductor device 1 can be reduced more quickly by interruption unit 7 using state determination signal Vsc output from detection circuit 4, without involving the drive circuit 5.

As described above, the power semiconductor device protection circuit according to Embodiment 4 uses state determination signal Vsc, output from detection circuit 4, to control gate voltage Vge of power semiconductor device 1. This allows controlling of gate voltage Vge that is applied to power semiconductor device 1 when power semiconductor device 1 is short-circuited. As a result, in the present embodiment, since gate voltage Vge can be reduced more quickly than Embodiment 1, power semiconductor device 1 can be better prevented from being destroyed in the present embodiment than Embodiment 1.

Embodiment 5

FIG. 8 is a diagram showing a power semiconductor device protection circuit 5000 according to Embodiment 5. Protection circuit 5000 according to Embodiment 5 is different from protection circuit 1000 according to Embodiment 1 in that protection circuit 5000 according to Embodiment 5 includes a first latch circuit 8, a second latch circuit 9, and a hold-time adjuster circuit 10.

First latch circuit 8 receives output of detection circuit 4. Output of second latch circuit 9 is sent to interruption unit 6 and hold-time adjuster circuit 10. Second latch circuit 9 receives output of detection circuit 4. Second latch circuit 9 outputs an error signal ERR representing that a short-circuit condition is detected. The retained states of first latch circuit 8 and second latch circuit 9 are reset by a reset signal VR1 from outside the protection circuit 5000.

Hold-time adjuster circuit 10 receives the output of first latch circuit 8 and a control signal ADj from outside the protection circuit 5000. The following three advantageous effects are provided by protection circuit 5000 including first latch circuit 8, second latch circuit 9, and hold-time adjuster circuit 10.

The first advantageous effect is now described. When power semiconductor device 1 is short-circuited, detection circuit 4 compares the magnitude of emitter voltage Ve, which changes as the current of current detector 3a changes, and the magnitude of a predetermined detection voltage Vsen, thereby determining the short-circuit condition, and interruption unit 6 interrupts control signal Vsig. However, a time for which control signal Vsig is interrupted (hereinafter, an interruption time) is a time which the detection circuit 4 takes to determine the short-circuit condition. Without protection circuit 5000 including first latch circuit 8 and hold-time adjuster circuit 10, the interruption time cannot be previously determined or adjusted. If the interruption time cannot be adjusted and the interruption time is shorter than the short-circuit time, an interruption and a short circuit may repeat.

In Embodiment 5, protection circuit 5000 includes first latch circuit 8 and hold-time adjuster circuit 10. Hold-time adjuster circuit 10 adjusts the interruption time, and first latch circuit 8 generates an interruption signal Vsc for the tuned interruption time. This keeps the interruption time from being shorter than the short-circuit time, thereby preventing the oscillation phenomenon in which an interruption and a short circuit repeat.

The second advantageous effect is that error signal ERR representing that the short-circuit condition is detected can be output to outside protection circuit 5000 by second latch circuit 9.

In Embodiment 1, while detection circuit 4 can detect the short-circuit condition and interruption unit 6 can interrupt the short-circuit condition, if an error signal representing that the short-circuit condition is detected cannot be output externally, external control signal Vsig cannot be controlled in response to the short-circuit condition. Since protection circuit 5000 includes second latch circuit 9, error signal ERR representing that the short-circuit condition is detected cam be output out of protection circuit 5000. Thus, a user is allowed to control the control signal Vsig to the presence or absence the short-circuit condition.

The third advantageous effect is that first latch circuit 8 and second latch circuit 9 can be reset by external reset signal VR1.

The interruption time can be set shorter than a predetermined interruption time of hold-time adjuster circuit 10 by resetting the retained state of first latch circuit 8 by reset signal VR1. This allows the user to control the interruption time. Error signal ERR, representing that the short-circuit condition is detected, can also be reset by reset signal VR1.

Figure 9:
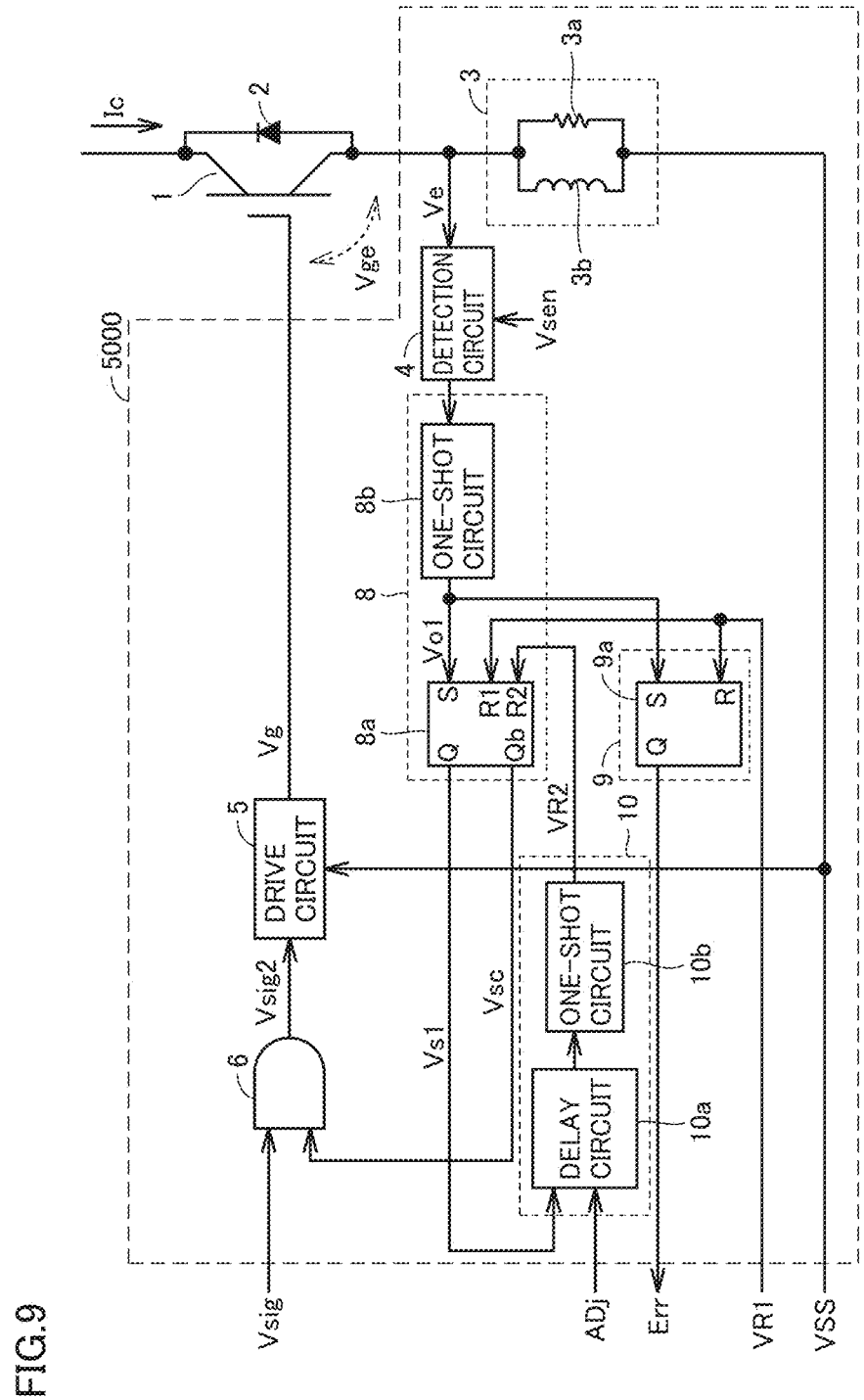
FIG. 9 is a diagram showing details of protection circuit 5000 of FIG. 8.

FIG. 9 is a diagram showing details of protection circuit 5000 of FIG. 8.

As shown in FIG. 9, first latch circuit 8 includes a one-shot circuit 8b and an RS flip-flop 8a. Second latch circuit 9 includes a RS flip-flop 9a. Hold-time adjuster circuit 10 includes a delay circuit 10a and a one-shot circuit 10b.

Figure 10:
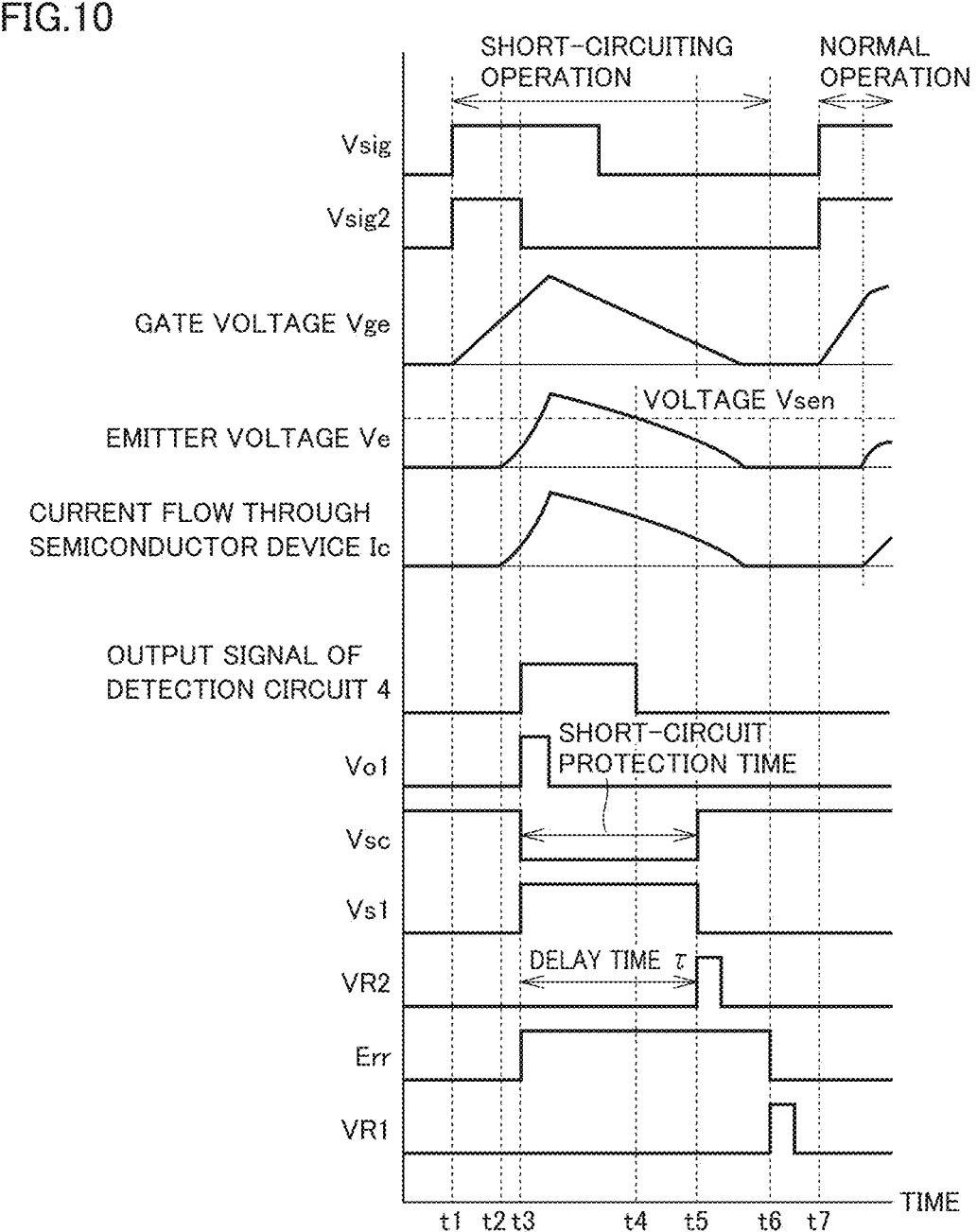
FIG. 10 is a diagram showing an example operation of protection circuit 5000 according to Embodiment 5 when the power semiconductor device is short-circuited.

FIG. 10 is a diagram showing example operation of a power semiconductor device protection circuit 5000 according to Embodiment 5 in the event of a short circuit.

FIG. 10 shows signals corresponding to the respective nodes (Vsig, Vsig2, Vge, Ve, Ic, the output signal of detection circuit 4, Vo1, Vsc, Vs1, VR2, Err, VR1) of protection circuit 5000 whose circuit blocks are shown in detail in FIG. 9.

As shown in FIG. 10, if an overcurrent flows through power semiconductor device 1 and a short-circuiting operation is caused at time t1, current Ic flow through power semiconductor device 1 increases at time t2.

At time t3, as emitter voltage Ve increases greater than short-circuit detection voltage Vsen, power semiconductor device 1 is determined to be short-circuited, and the output signal of detection circuit 4 changes from low to high. One-shot circuit 8b within first latch circuit 8 generates a one-shot pulse signal Vo1, in response to a change in output signal of detection circuit 4.

Pulse signal Vo1 is input to a set terminal S of RS flip-flop 8a within first latch circuit 8. Output signal Vs1 of an output terminal Q of RS flip-flop 8a changes from low to high, and output signal Vsc (an interruption signal) of an output terminal Qb of RS flip-flop 8a changes from high to low. Output signal Vsc is sent to interruption unit 6 and interrupts control signal Vsig, and control signal Vsig2 changes to low. A pulse signal Vo1 is also sent to a set terminal S of RS flip-flop 9a included in second latch circuit 9. Output terminal Q of RS flip-flop 9a changes from low to high, and error signal ERR representing that the short-circuit condition is detected is output outside the protection circuit 5000.

At time t4, as emitter voltage Ve decreases smaller than short-circuit detection voltage Vsen, the output signal of detection circuit 4 changes from high to low.

At time t5, delay circuit 10a within hold-time adjuster circuit 10 sets a delay time τ for delay circuit 10a. using control signal ADj which previously controls the interruption time. Delay circuit 10a causes a delay in output signal Vs1 of RS flip-flop 8a by delay time τ. One-shot circuit 10b receives the output signal of delay circuit 10a, and generates a one-shot pulse signal VR2 which delays behind output signal Vs1 of RS flip-flop 8a by delay time τ. Pulse signal VR2 is input to a reset terminal R2 of RS flip-flop 8a. This resets the output state of RS flip-flop 8a, and interruption signal Vsc changes from high to low. Accordingly, interruption signal Vsc is allowed to interrupt control signal Vsig for time τ set by hold-time adjuster circuit 10.

At time t6, as the external reset signal VR1 is changed from low to high, RS flip-flop 9a is reset and error signal Err changes from high to low.

As described above, protection circuit 5000 according to Embodiment 5 provides the three advantageous effects as described above by including first latch circuit 8, second latch circuit 9, and hold-time adjuster circuit 10. The first advantageous effect is that the interruption time is kept from being shorter than the short-circuit time, preventing the oscillation phenomenon in which an interruption and a short circuit repeat. The second advantageous effect is that the signal representing the presence or absence of a short-circuit condition can be output to outside protection circuit 5000. The third advantageous effect is that the interruption time can be controlled by hold-time adjuster circuit 10 to other than a pre-set interruption time.

Embodiment 6

Figure 11:
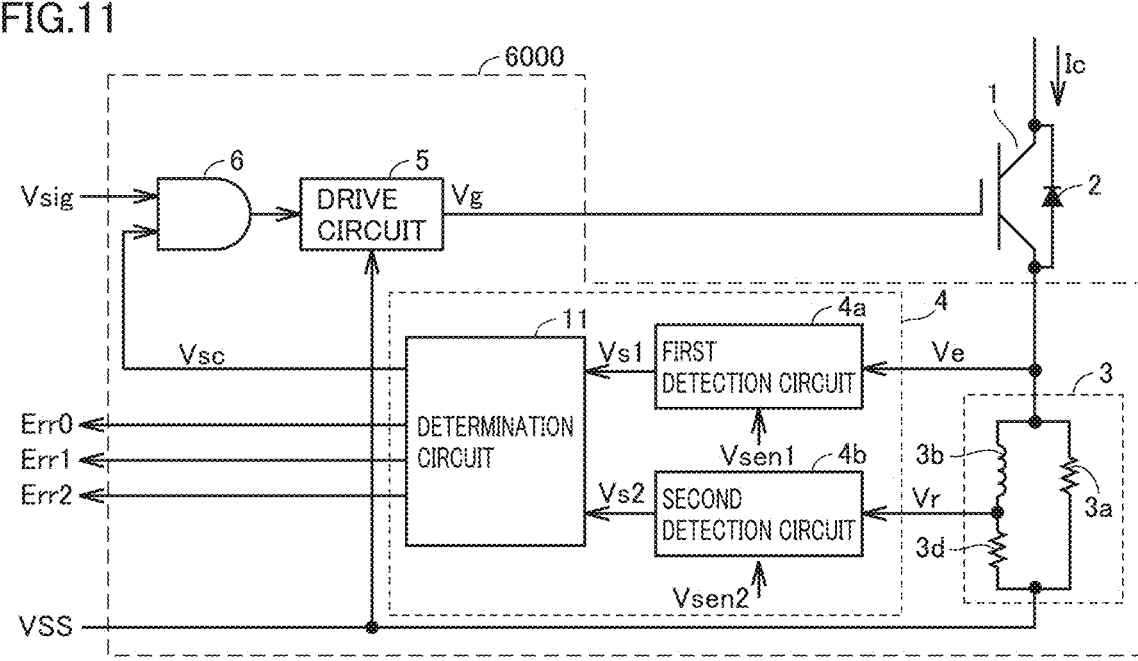
FIG. 11 is a diagram showing a power semiconductor device protection circuit 6000 according to Embodiment 6.

FIG. 11 is a diagram showing a power semiconductor device protection circuit 6000 according to Embodiment 6. Protection circuit 6000 according to Embodiment 6 is different from protection circuit 3000 according to Embodiment 3 in that a detection circuit 4 according to protection circuit 6000 includes a first detection circuit 4a, a second detection circuit 4b, and a determination circuit 11.

First detection circuit 4a compares the magnitude of an emitter voltage Ve (using a VSS potential as a reference) of power semiconductor device 1 and the magnitude of a predetermined first short-circuit detection voltage Vsen1, thereby detecting a short-circuit condition. First detection circuit 4a outputs a signal Vs1 representing a result of the detection.

Second detection circuit 4b compares the magnitude of a voltage Vr of a second resistor 3d (using VSS potential as a reference) with the magnitude of a predetermined second short-circuit detection voltage Vsen2, thereby detecting the short-circuit condition. Second detection circuit 4b output a signal Vs2 representing a result of the detection.

Determination circuit 11 determines a short-circuit path in the power converter, in response to output signal Vs1 of first detection circuit 4a and output signal Vs2 of second detection circuit 4b. Furthermore, if determination circuit 11 determines that the power semiconductor device is short-circuited, an interruption unit 6 interrupts a control signal Vsig input to a drive circuit 5. Determination circuit 11 outputs a signal representing the determined short-circuit path to outside the protection circuit 6000.

A power converter which includes a power semiconductor device has a short-circuit path that depends on a cause of a short circuit. Examples of a general short-circuit path of the power converter includes an arm short circuit in which an upper arm and a lower arm are short-circuited, an output short-circuit in which a load included in the power converter is short-circuited, and a ground fault in which a load included in the power converter is short-circuited to the ground potential. In an arm short circuit, an upper arm and a lower arm are short-circuited in series and the short-circuit current flows at a high speed, resulting in an increased current change (dIc/dt) in the short-circuit current. In an output short-circuit and a ground fault, in contrast, the short-circuit current flows via the load included in the power converter. The value of dIc/dt depends on the magnitude of the load and is less than dIc/dt in an arm short circuit.

Detection circuit 4 included in protection circuit 6000 for power semiconductor device 1 according to Embodiment 6 provides the following advantageous effects by including first detection circuit 4a, second detection circuit 4b, and determination circuit 11.

Advantageous effects of protection circuit 6000 for power semiconductor device 1 according to Embodiment 6 is that an arm short circuit can be distinguished from the other short circuits (output short-circuit and ground fault) at short-circuit paths having different dIc/dt. As a result, power semiconductor device 1 can be prevented from being destroyed in response to the short-circuit path determined by determination circuit 11.

If an arm short circuit having a large dIc/dt occurs, the voltage drop occurred at inductor 3b is increased. Short-circuit detection voltage Vsen1 of first detection circuit 4a is set lower than emitter voltage Ve (Ve_arm) in the event of the arm short circuit (Vsen1<Ve_arm).

If an output short-circuit or ground fault having a small dIc/dt occurs, the voltage drop occurred at inductor 3b is reduced, and the voltage drop occurred at second resistor 3d dominates. As the current of power semiconductor device 1 is saturated by the short-circuit condition, current Ic flow through the power semiconductor device is shunt by first resistor 3a and second resistor 3d. Thus, the current I3dsat flow through second resistor 3d results in Ic×R3a/(R3a+R3d).

Accordingly, an arm short circuit in the power converter can be detected by setting short-circuit detection voltage Vsen1 of first detection circuit 4a greater than a product of I3dsat and R3d, and less than emitter voltage Ve_arm in the event of the arm short circuit.

An arm short circuit, an output short-circuit, and the ground fault of the power converter can be detected by setting short-circuit detection voltage Vsen2 of second detection circuit 4b: smaller than a product of I3dsat and R3d; less than short-circuit detection voltage Vsen1 of first detection circuit 4a; and greater than resistance R3d of second resistor 3d and current IR3d flow through second resistor 3d in the normal operation.

Determination circuit 11 also uses a result of the detection by first detection circuit 4a and a result of the detection by second detection circuit 4b to determine a short-circuit path.

In Embodiment 6, the conditions for accurately determining a short-circuit path in the power converter by determination circuit 11, without malfunctioning, are rearranged as:

$$Ve\_arm = I3d + L \times dILS\_arm/dt > Vsen1 > I3dsat \times R3d > Vsen2 > R3d \times IR3d \quad (3)$$

where dILS_arm denotes the current that flows through inductor 3b in the event of an arm short circuit.

Figure 12:
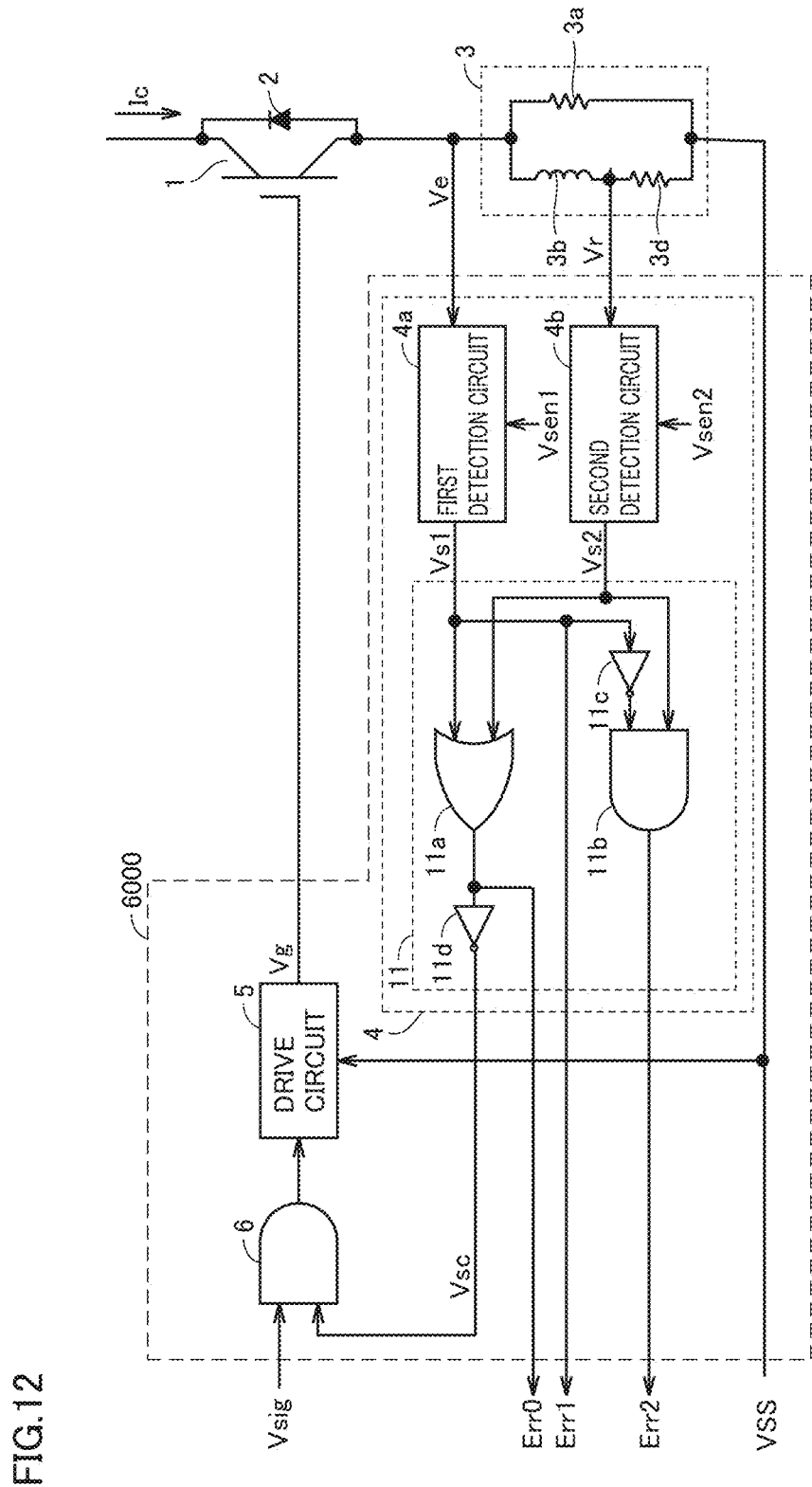
FIG. 12 is a diagram showing details of a determination circuit 11 of FIG. 11.

FIG. 12 is a diagram showing details of determination circuit 11 of FIG. 11.

Determination circuit 11 includes an OR circuit 11a, a NOT circuit 11d, a NOT circuit 11c, and an AND circuit 11b.

OR circuit 11a outputs a logical OR of output signal Vs1 of first detection circuit 4a and output signal Vs2 of second detection circuit 4b. The output signal of OR circuit 11a is output to outside the protection circuit 6000 as a state determination signal Err0. NOT circuit 11d inverts the output of OR circuit 11a and outputs interruption signal Vsc.

Output signal Vs1 of first detection circuit 4a is output to outside the protection circuit 6000 as a state determination signal Err1.

NOT circuit 11c inverts output signal Vs1 of first detection circuit 4a. AND circuit 11b outputs a logical AND of the output signal of NOT circuit 11c and output signal Vs2 of second detection circuit 4b. The output signal of AND circuit 11b is output to outside the protection circuit 6000 as a state determination signal Err2.

Based on state determination signal Vsc that is output from determination circuit 11 in the event of a short circuit, control signal Vsig input to drive circuit 5 is interrupted. If first detection circuit 4a determines that an arm short circuit has occurred in the power converter, output signal Vs1 changes to high. If second detection circuit 4b determines that an output short-circuit or a ground fault has occurred in the power converter, output signal Vs2 changes to high.

FIG. 13 is a diagram showing a truth table for determination circuit 11. As shown in FIG. 13, based on determination circuit 11, signal Vsc, which interrupts control signal Vsig to be input to drive circuit 5, changes to high if the power converter is determined to be in a normal state, and signal Vsc changes to low if the power converter is determined to be in a short-circuit condition which is any of an arm short circuit, an output short-circuit, and a ground fault.

State determination signal Err0, which is output to outside the protection circuit 6000, changes to low if determination circuit 11 determines that the power converter is in a normal state, and state determination signal Err0 changes to high if determination circuit 11 determines that the power converter is in a short-circuit condition which is any of an arm short circuit, an output short-circuit, and a ground fault.

State determination signal Err1 changes to high if determination circuit 11 determines that the power converter is in an arm short circuit, and state determination signal Err1 changes to low if determination circuit 11 does not determine that the power converter is in an arm short circuit.

State determination signal Err2 changes to high if determination circuit 11 determines that the power converter is in an output short-circuit or a ground fault, and state determination signal Err2 changes to low if determination circuit 11 does not determine that the power converter is in an output short-circuit or a ground fault.

Embodiment 7

Figure 14:
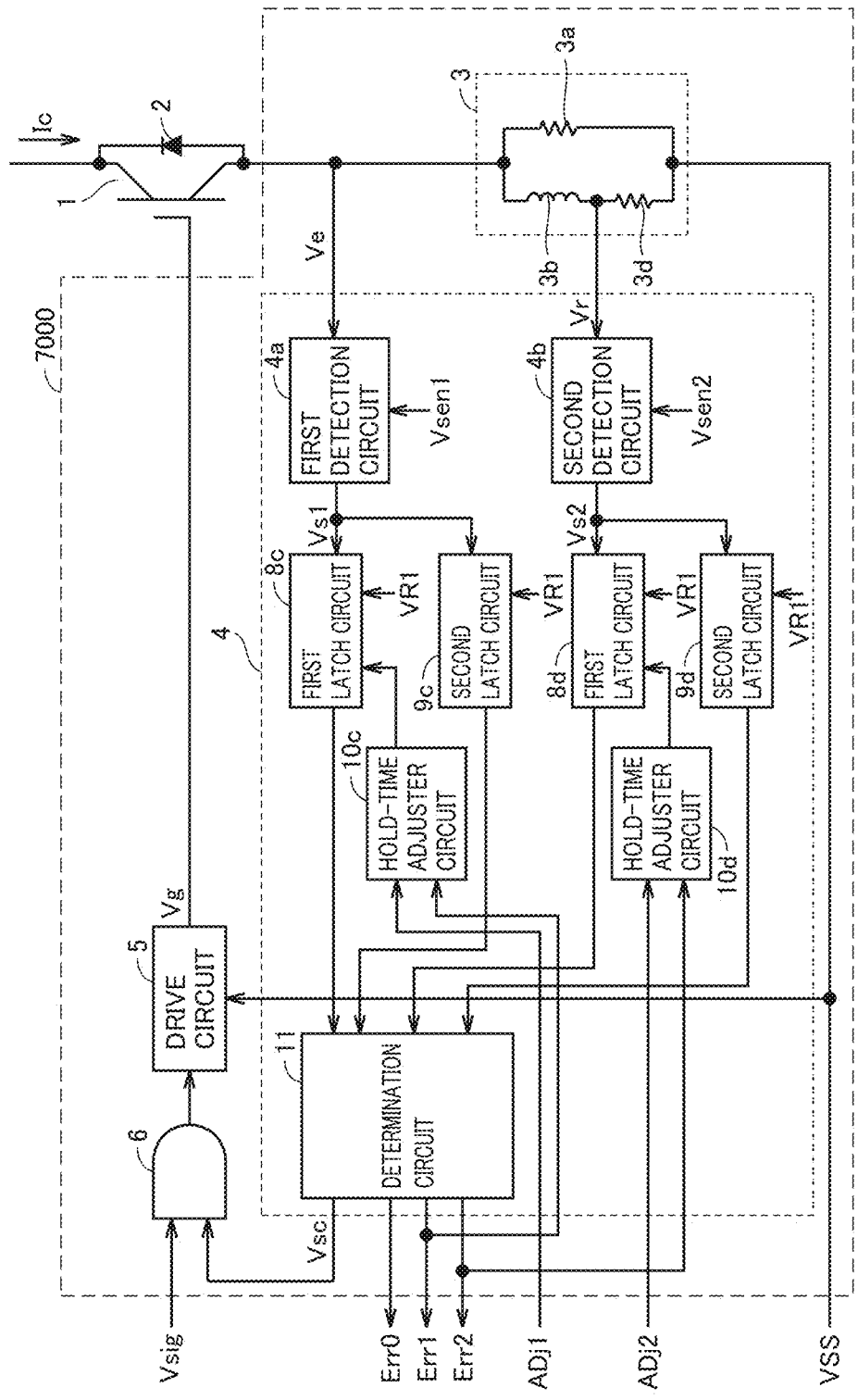
FIG. 14 is a diagram showing a power semiconductor device protection circuit 7000 according to Embodiment 7.

FIG. 14 is a diagram showing a power semiconductor device protection circuit 7000 according to Embodiment 7.

Protection circuit 7000 is a combination of protection circuit 6000 according to Embodiment 6 and protection circuit 5000 according to Embodiment 5.

As shown in FIG. 14, protection circuit 7000 includes a first latch circuit 8c, a second latch circuit 9c, and a hold-time adjuster circuit 10c between first detection circuit 4a and determination circuit 11.

Protection circuit 7000 further includes a latch circuit 8d, a second latch circuit 9d, and a hold-time adjuster circuit 10d between second detection circuit 4b and determination circuit 11.

While output signal Err1 (an arm short circuit detection signal) and Err2 (an output short circuit detection signal or a ground fault detection signal) of determination circuit 11 are used as input signals to hold-time adjuster circuits 10c, 10d, protection circuit 5000 provides the same advantageous effects.

As described above, the protection circuit according to Embodiment 7, since it has both functionalities of protection circuit 6000 according to Embodiment 6 and protection circuit 5000 according to Embodiment 5, can achieve the advantageous effects of both protection circuit 5000 and protection circuit 6000.

Embodiment 8

Figure 15:
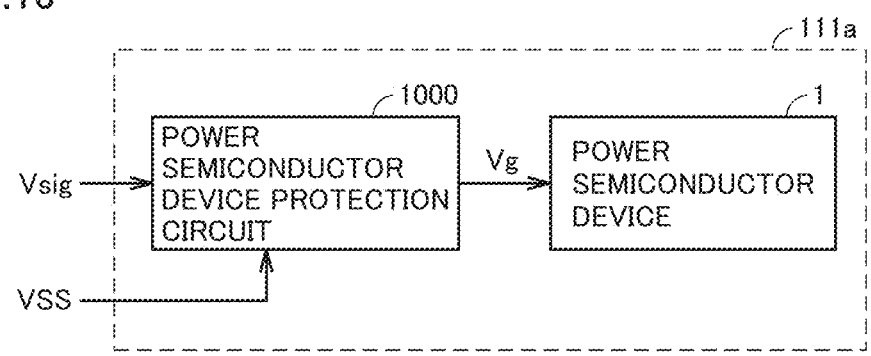
FIG. 15 is a diagram representing a configuration of a power module 111a according to Embodiment 8.

FIG. 15 is a diagram representing a configuration of a power module 111a according to Embodiment 8.

As shown in FIG. 15, power module 111a includes power semiconductor device 1 that is implemented in one package, and power semiconductor device protection circuit 1000 according to Embodiment 1. Power module 111a has a configuration (a 1-in-1 module) of having one power semiconductor device and one power semiconductor device protection circuit built therein. Power module 111a may have a configuration (a 2-in-1 module or a 6-in-1 module) of having two power semiconductor devices and two power semiconductor device protection circuit built therein. Moreover, power semiconductor device protection circuits 2000 to 6000 according to Embodiments 2 to 7 may be used instead of protection circuit 1000 for a power semiconductor device according to Embodiment 1.

In Embodiment 8, by applying the power semiconductor device protection circuit according to any of Embodiments 1 to 7 to the power module, a power module can be provided that is highly effective in preventing the power semiconductor device from being destroyed at a short-circuiting operation.

The presently disclosed embodiments should be considered in all aspects as illustrative and not restrictive. The scope of the present disclosure is indicated by the appended claims, rather than by the description above, and all changes that come within the scope of the claims and the meaning and range of equivalency of the claims are intended to be embraced within their scope.

Note that the embodiments according to the present disclosure can be combined in any manner, or modified or omitted as appropriate, within the scope of the disclosure.

REFERENCE SIGNS LIST 1 power semiconductor device; 2 freewheel diode; 3, 999 current detector; 3a first resistor; 3b inductor; 3c Zener diode; 3d second resistor; 4 detection circuit; 4a first detection circuit; 4b second detection circuit; 5 drive circuit; 6, 7 interruption unit; 8, 8c, 9c, 8d, 9d latch circuit; 8a, 9, 9a RS flip-flop; 8b,10b one-shot circuit; 10, 10c, 10d hold-time adjuster circuit; 10a delay circuit; 11 determination circuit; 11a OR circuit; 11b AND circuit; 11c, 11d NOT circuit; 99 resistor; 111a power module; and 1000, 2000, 3000, 4000, 5000, 6000, 7000, 9000 power semiconductor device protection circuit.

The invention claimed is:

1. A power semiconductor device protection circuit comprising:
a drive circuit to drive a power semiconductor device;
a current detector which includes a first resistor and an inductor connected in parallel; and
a detection circuit to detect a short-circuit condition of the power semiconductor device, wherein
one end of the first resistor and one end of the inductor are connected to one terminal of the power semiconductor device,
the detection circuit detects the short-circuit condition of the power semiconductor device by comparing a voltage of the one terminal of the power semiconductor device, which changes as a function of current flow through the first resistor and the inductor, with a predetermined short-circuit detection voltage, and
a reference potential of the drive circuit is connected to the other end of the first resistor.

2. The power semiconductor device protection circuit according to claim 1, wherein
the inductor has an impedance higher than an impedance of the first resistor.

3. The power semiconductor device protection circuit according to claim 2, wherein
the reference potential of the drive circuit, the other end of the first resistor, and the other end of the inductor are connected,
a product of a inductance value of the inductor and changes in current over time that flows through the inductor when the power semiconductor device is short-circuited, and a product of a resistance of the first resistor and a current value of the current that flows through the first resistor when the power semiconductor device is short-circuited correspond to an emitter voltage of the power semiconductor device, wherein
when the power semiconductor device is short-circuited, the short-circuit detection voltage is less than the emitter voltage of the power semiconductor device, and
when the power semiconductor device is in normal operation, the short-circuit detection voltage is greater than the emitter voltage of the power semiconductor device.

4. The power semiconductor device protection circuit according to claim 1, wherein
the current detector includes a Zener diode connected in parallel to the first resistor and the inductor.

5. The power semiconductor device protection circuit according to claim 4, wherein
the Zener diode has a breakdown voltage value higher than the short-circuit detection voltage.

6. The power semiconductor device protection circuit according to claim 4, wherein
a voltage value of a forward voltage drop of the Zener diode is lower than a threshold voltage of the power semiconductor device.

7. The power semiconductor device protection circuit according to claim 1, wherein
the current detector further includes a second resistor connected in series to the inductor.

8. The power semiconductor device protection circuit according to claim 7, wherein
the reference potential of the drive circuit and the other end of the first resistor, are connected,
(i) a sum of a product of a inductance value of the inductor and changes in current over time that flows through the inductor when the power semiconductor device is short-circuited and a product of a resistance of the second resistor and a current value of current that flows through the second resistor when the power semiconductor device is short-circuited and (ii) a product of a resistance of the first resistor and a current value of the current that flows through the first resistor when the power semiconductor device is short-circuited correspond to an emitter voltage of the power semiconductor device,
when the power semiconductor device is short-circuited, the short-circuit detection voltage is less than the emitter voltage of the power semiconductor device, and
when the power semiconductor device is in normal operation, the short-circuit detection voltage is greater than the emitter voltage of the power semiconductor device.

9. The power semiconductor device protection circuit according to claim 1, wherein
the detection circuit outputs a state determination signal indicating whether the power semiconductor device is in the short-circuit condition,
the power semiconductor device protection circuit further comprising
an interruption unit to interrupt a control signal input to the drive circuit, according to the state determination signal.

10. The power semiconductor device protection circuit according to claim 7, wherein
the detection circuit outputs a state determination signal indicating whether the power semiconductor device is in the short-circuit condition,
the power semiconductor device protection circuit further comprising
an interruption unit disposed between (i) an output of the drive circuit and (ii) the other end of the first resistor, wherein the interruption unit connects or disconnects between (i) the output of the drive circuit and (ii) the other end of the first resistor, according to the state determination signal.

11. The power semiconductor device protection circuit according to claim 9, comprising:
a first latch circuit to hold a signal detected by the detection circuit and output the state determination signal;
a second latch circuit to hold the signal detected by the detection circuit and externally output a signal indicating whether the power semiconductor device is in the short-circuit condition; and
a hold-time adjuster circuit to adjust a hold time of the first latch circuit.

12. The power semiconductor device protection circuit according to claim 11, wherein
the first latch circuit and the second latch circuit are reset by an external reset signal.

13. The power semiconductor device protection circuit according to claim 7, wherein
the detection circuit includes:
a first detection circuit to detect the short-circuit condition of the power semiconductor device by comparing the voltage of the one terminal of the power semiconductor device with a first short-circuit detection voltage;
a second detection circuit to detect the short-circuit condition of the power semiconductor device by comparing a voltage of one end of the second resistor with a second short-circuit detection voltage; and
a determination circuit to determine a short-circuit path in a power converter that includes the power semiconductor device, based on a result of detection by the first detection circuit and a result of detection by the second detection circuit.

14. The power semiconductor device protection circuit according to claim 13, wherein
based on the result of detection by the first detection circuit and the result of detection by the second detection circuit, the determination circuit determines that the power converter is a normal state, an arm short-circuit condition, an output short-circuit condition, or a ground-fault condition.

15. The power semiconductor device protection circuit according to claim 13, wherein
(i) a sum of a product of a inductance value of the inductor and changes in current over time that flows through the inductor when the power semiconductor device is short-circuited and a product of a resistance of the second resistor and a current value of current that flows through the second resistor when the power semiconductor device is short-circuited and (ii) a product of a resistance of the first resistor and a current value of the current that flows through the first resistor when the power semiconductor device is short-circuited correspond to an emitter voltage of the power semiconductor device,
the first short-circuit detection voltage is less than the emitter voltage of the power semiconductor device when an arm short circuit occurs in the power converter that includes the power semiconductor device,
the second short-circuit detection voltage is less than a product of a saturation current of the power semiconductor device and the resistance of the second resistor,
the first short-circuit detection voltage is greater than the second short-circuit detection voltage, and
the second short-circuit detection voltage is greater than a product of the resistance of the second resistor and the current flow through the second resistor in normal operation.

16. A power module comprising:
the power semiconductor device implemented in one package; and
the power semiconductor device protection circuit according to claim 1.

* * * * *